(12) United States Patent
Sotgiu et al.

(10) Patent No.: US 8,793,109 B2
(45) Date of Patent: Jul. 29, 2014

(54) DETERMINATION OF NON-UNIFORMITIES OF LOADED WHEELS BY LOAD SIMULATION

(75) Inventors: Paolo Sotgiu, Modena (IT); Francesco Braghiroli, Reggio Emilia (IT); Marco Tralli, Modena (IT)

(73) Assignee: Snap-on Equipment SRL A Unico Socio, Correggio (IT)

( * ) Notice: Subject to any disclaimer, the term of this patent is extended or adjusted under 35 U.S.C. 154(b) by 330 days.

(21) Appl. No.: 13/280,834

(22) Filed: Oct. 25, 2011

(65) Prior Publication Data

US 2013/0103374 A1    Apr. 25, 2013

(51) Int. Cl.
*G06G 7/48*    (2006.01)

(52) U.S. Cl.
USPC .................................. 703/6; 703/2; 703/7

(58) Field of Classification Search
USPC .............. 703/6, 7, 2, 8; 73/66, 146, 461, 462; 700/279; 72/353.4; 156/75, 110.1; 701/41, 29, 82; 152/154.1
See application file for complete search history.

(56) References Cited

U.S. PATENT DOCUMENTS

| 4,016,020 | A | * | 4/1977 | Ongaro | 156/75 |
| 4,704,900 | A | | 11/1987 | Beebe | |
| 5,568,745 | A | * | 10/1996 | Daudi | 72/353.4 |
| 6,360,593 | B1 | * | 3/2002 | Schoenfeld | 73/146 |
| 6,397,675 | B1 | | 6/2002 | Colarelli, III et al. | |
| 2002/0100321 | A1 | * | 8/2002 | Douglas et al. | 73/461 |
| 2003/0005764 | A1 | * | 1/2003 | Colarelli et al. | 73/462 |
| 2003/0036834 | A1 | * | 2/2003 | Kunsch et al. | 701/41 |
| 2005/0262933 | A1 | * | 12/2005 | Zhu et al. | 73/146 |
| 2007/0074565 | A1 | * | 4/2007 | Jayakumar et al. | 73/146 |
| 2007/0144657 | A1 | * | 6/2007 | Flament et al. | 156/110.1 |
| 2007/0233352 | A1 | * | 10/2007 | Miyashita et al. | 701/82 |
| 2008/0119962 | A1 | * | 5/2008 | Voeller et al. | 700/279 |
| 2008/0119978 | A1 | * | 5/2008 | Stieff et al. | 701/29 |
| 2008/0154561 | A1 | * | 6/2008 | Shiraishi | 703/8 |
| 2009/0272471 | A1 | * | 11/2009 | Bormann | 152/154.1 |
| 2010/0030533 | A1 | * | 2/2010 | Ueda et al. | 703/2 |
| 2010/0179796 | A1 | * | 7/2010 | Miyamoto | 703/8 |
| 2011/0023589 | A1 | * | 2/2011 | Seitz | 73/66 |
| 2011/0056284 | A1 | | 3/2011 | Hanada et al. | |

* cited by examiner

*Primary Examiner* — Kandasamy Thangavelu
(74) *Attorney, Agent, or Firm* — McDermott Will & Emery LLP

(57) ABSTRACT

The invention relates to a method for contactless determining non-uniformities of a loaded wheel, comprising the steps of determining outer contour of at least a portion of the unloaded wheel; simulating loading of the wheel with a virtual loading element bearing against the tire tread for a plurality of rotary positions of the wheel on the basis of the determined outer contour, a displacement of the determined outer contour caused by the virtual loading element and a predetermined spring rate associated to the tire tread; and determining non-uniformities of the loaded wheel using the simulation results.

15 Claims, 6 Drawing Sheets

DETERMINATION OF NON-UNIFORMITIES OF LOADED WHEELS BY LOAD SIMULATION

BACKGROUND OF THE INVENTION

1. Technical Field

The invention relates to a method for determining non-uniformities of a loaded wheel, in particular a pneumatic motor vehicle wheel, such as variations of radial or lateral forces acting on the wheel or radial or lateral runout of the loaded wheel. Furthermore, the inventions relates to a system or an apparatus for carrying out such methods. In particular, the invention relates to an improved method and apparatus for contactless determination of said non-uniformities of a loaded wheel by simulating the loading.

2. Background Art

Even when a pneumatic motor vehicle wheel is balanced, non-uniformity in the construction of the tyre and also runout of the wheel rim can result in significant vibration forces when the wheel is rolling under load, what is the normal operation condition. The assumption that a wheel/tyre assembly which is suitably balanced under no-load condition will also be suitably balanced when installed on a vehicle and subjected to a substantial load resulting from the vehicle weight, is not necessarily valid.

Non-uniformities of a loaded wheel can result from radial or lateral runout of the tyre and/or the rim as well as variations in tyre stiffness caused by non-uniformities of tyre construction such as variations in the carcass or the tyre wall thickness, for example. Such non-uniformities cause variations in the rolling diameter of the loaded wheel along the circumference, i.e. within one revolution of the wheel. This results in vertical movements of the wheel axis, and thus vertical vibration forces acting on the wheel suspension of a driving vehicle.

It is desirable to determine said non-uniformities of a loaded wheel such as force variations and/or runout. Then the determined non-uniformities can be used during the operation of a wheel balancer or a tyre changer to correct the magnitudes or locations of balancing weights or to identify an angular remount position of the rim/tyre assembly, for example. Thus, disadvantageous effects of said non-uniformities of a loaded wheel can be mitigated or even eliminated.

A wheel balancer for determining non-uniformities such as radial force variations or radial runout of rolling loaded wheels is known from U.S. Pat. No. 6,397,675. With this wheel balancer, a load roller is provided for applying a substantial radial force to the rim/tyre assembly (wheel) during rotation of the wheel. Movement of the load roller during rotation of the wheel is observed to measure radial runout of the loaded wheel. Furthermore, vibration forces of the rolling loaded wheel are measured by the vibration sensors of the wheel balancer.

Providing a load roller to measure loaded rolling wheels under realistic conditions requires massive construction of a corresponding measuring apparatus because of the strong forces typically applied to the wheel by the load roller. This results in a heavy and bulky apparatus and increases costs.

It is an object of the present invention to provide an improved method and system for determining non-uniformities of a loaded wheel without requiring application of strong forces to the wheel.

BRIEF SUMMARY OF THE INVENTION

In accordance with the invention, that object is solved by a method according to claim 1 and a system according to claim 11. The dependent claims refer to further developments of the invention.

In a first aspect, the invention provides a method for determining non-uniformities of a loaded wheel comprising a rim and a tyre mounted to the rim, the method comprising the steps of determining outer contour of at least a portion of the unloaded wheel, the portion comprising at least a tread of the tyre, simulating loading of the wheel with a virtual loading element bearing against the tyre tread for a plurality of rotary positions of the wheel on the basis of the determined outer contour, a displacement of the determined outer contour caused by the virtual loading element, and a predetermined spring rate associated to the tyre tread, and determining non-uniformities of the loaded wheel using the simulation results.

In other words, in a first step, the outer contour of a wheel is scanned and contour data of the wheel are obtained. The contour data may comprise a plurality of radial cross sections of the outer contour of the wheel or the scanned portion of the wheel in a two dimensional representation, wherein each radial cross section is associated to a certain rotary position of the wheel. In a next step, one of the radial cross sections of the contour data is considered and a virtual loading element represented by a line parallel to the wheel axis is virtually moved in radial direction to the wheel axis thereby displacing and deforming the radial cross section of the outer contour, in particular the tread portion of the same. Since the tyre provides resistance to such a deformation and displacement of the outer contour because of the tyre inflation pressure and tyre material stiffness, the virtual displacement of each individual (infinitesimal) portion of the radial cross section of the outer contour caused by the advancing virtual loading element can be represented by a displacement (compression) of a small virtual spring having a certain predetermined spring rate. A force required to displace the individual portion of the outer contour to the extent effected by the virtual loading element may be derived from the displacement distance with respect to the unloaded position by means of the predetermined spring rate and Hook's Law. Integrating the individual (infinitesimal) forces of the individual contour portions along the radial cross section of the outer contour leads to total force which is required to move and hold the virtual loading element in the considered position. Thus, a total load force associated to a certain loading element position having a certain distance to the wheel axis is obtained. Alternatively, it is also possible to gradually advance the virtual loading element in direction to the wheel axis until a certain total load force is achieved. Thus, a loading element position associated to a certain total load force is obtained. This is repeated for each rotary position of the wheel to obtain a respective total load force, or alternatively a respective loading element position, associated to the radial cross section of the outer contour determined for that rotary position of the wheel. Since in reality a wheel is not perfectly symmetric and not perfectly circular, the radial cross sections of the outer contour associated to different rotary positions of the wheel may be different. This results in different values of the total load force or the loading element position, respectively. Thus, for example, a varying radial force (load force) or a varying rolling radius of a wheel rolling under load can be determined from the plurality of load forces or loading element positions, respectively, determined according to the simulation described above.

By simulative loading the wheel with a virtual loading element, it is not necessary to provide a real load roller so that a measuring apparatus can be less bulky and heavy and the costs of such an apparatus can be reduced. This is valid in particular in the case of a vehicle service machine already comprising a scanning device capable of scanning the outer contour of the wheel to be handled.

In a further development of the invention, the step of simulating comprises simulative loading the wheel with a predetermined force exerted by the virtual loading element, while the step of determining non-uniformities comprises determining radial runout of the loaded wheel. This corresponds to a realistic operation condition where the wheel is loaded with a certain weight of the driving vehicle. Thus, for example, vertical movement of the wheel axis during low speed driving can be estimated, when the damping effect of the suspension system does not substantially mitigate such movement.

According to a further aspect of the invention, the simulating step may comprise varying and setting a displacement of the determined outer contour for respective rotary positions of a wheel caused by the virtual loading element so that a load force calculated from the displacement and the predetermined spring rate is constant for all rotary positions of the wheel, while the step of determining non-uniformities comprises determining at least one of a variation of tread displacement and a varying distance of the virtual loading element to the rotation axis of the wheel varying along the circumferential direction of the wheel.

In another independent development of the invention, the step of simulating comprises simulative loading the wheel while a predetermined distance between the virtual loading element and a rotation axis of the wheel is provided, and the step of determining non-uniformities comprises determining radial force variation of the loaded wheel. This corresponds to a realistic operation condition where the loaded wheel is rolling with a substantially constant distance between the wheel axis and the road surface. Thus, for example, vertical vibration forces acting on the suspension system during high speed driving can be estimated, when the damping effect of the suspension system substantially mitigates vertical movements of the wheel axis.

According to another independent aspect of the invention, the simulating step may comprise keeping constant the distance between the virtual loading element and the wheel axis and calculating a respective load force for all rotary positions of the wheel from the predetermined spring rate and the displacement of the determined outer contour caused by the virtual loading element, while the step of determining non-uniformities comprises determining from said load forces varying along the circumferential direction of the wheel a radial force variation of the loaded wheel.

In another, independent development of the invention, the step of determining non-uniformities further comprises determining at least one of lateral force variation or lateral runout of the loaded wheel. Thus, lateral forces influencing the driving stability and in particular the directional stability of the vehicle can be evaluated.

In an independent further development of the invention the predetermined spring rate can be corrected according to at least one of a tyre type, a tyre size, a tyre inflation pressure and a rim type. All that parameters have more or less influence on the tyre stiffness and the local strength of the spring rate so that consideration of them further increases accuracy of the simulation. These parameters can be measured or determined automatically or can be input by the operator, for example.

According to a further aspect of the invention, which is independent from the previous aspects, the step of determining the outer contour of the wheel can comprise determining a radial runout and/or a lateral runout of the rim, wherein the step of simulating comprises consideration of the determined radial or lateral runout of the rim. Knowledge of radial or lateral runout of the rim is advantageous in order to separate the influence of the rim and the influence of the tyre on the determined outer contour of the wheel and the determined non-uniformities of the loaded wheel, respectively. Thus, load simulation can be increased in accuracy, and furthermore, an angular remount position of the rim/tyre assembly in order to mitigate or eliminate radial or lateral runout of the rim/tyre assembly can be determined, for example.

Furthermore, the predetermined spring rate associated to the tyre tread can be an infinitesimal spring rate which is assumed to be constant all over the tread surface, or can alternatively vary in accordance to an axial position of an associated tread portion. This variation of the spring rate can be accomplished by a corresponding weighting function. Thus, for example, the stronger influence of the edge portions in axial direction of the tread on the tyre stiffness and spring rate can be taken into account to increase accuracy of the load simulation. The edge portions in axial direction of the tread in general are stiffer, i.e. have a higher spring rate, because of the influence of the sidewalls of the tyre which are deformed when the edge portion of the tread are displaced.

Furthermore and independent from the above aspects, the predetermined spring rate associated to the tyre tread can be an infinitesimal spring rate which varies in accordance to a radial position of an associated tread portion. Also this variation of the spring rate can be accomplished by a corresponding weighting function. Thus, for example, the deviation of the tyre contour from a perfect circular circumference resulting from non-uniformities of the tyre structure can be taken into account to increase accuracy of the load simulation. Such non-uniformities in the tyre structure are assumed to not only result in tyre contour variations, but also in tyre stiffness variations. Therefore, there is a relationship between the radial position of an unloaded tread portion and its associated spring rate.

Furthermore and independent from the above aspects, the predetermined spring rate can be a non-linear infinitesimal spring rate varying in accordance to a displacement of the tyre tread caused by the loading. This advantageously takes into account that displacement of a tread portion in the beginning (i.e. small displacement) is influenced mainly by local geometrical deformations of the tyre material, while with larger displacements of the tread other factors such as the tyre inflation pressure and the tyre sidewall deformation gain influence with different strength. In this manner, accuracy of the load simulation can be increased.

According to a further aspect of the invention, the step of simulating can use the determined outer contour of a single radial cross-section of the wheel. In this manner, calculation and simulation of loading the wheel at the corresponding rotary position of the wheel is relatively simple and can provide sufficient accuracy of the results for several service applications, such as tyre diagnostics providing a simple good/bad evaluation, for example. To this, preferably appropriate assumptions for the required parameters, in particular the amount of the associated spring rate of the tread portion and its variation according to the axial position and/or the radial position as well as its non-linearity according to the tread displacement due to load may be made.

In a further development of the invention, which is independent from the other aspects, the step of simulating can use the determined outer contour of a plurality of adjacent radial cross-sections of the wheel to simulate a contact area between the virtual loading element and the tyre tread. In this manner, a more accurate load simulation can be achieved based on a more realistic tyre deformation due to load. Furthermore, it becomes possible to simulate loading of the wheel with virtual loading elements having different shape and take into account varying displacement of different tread portions and/or varying contact pressure within the contact area between the tyre tread and the surface of the virtual loading element. For example, load rollers with different diameters can be simulated, as well as a flat loading element representing a road surface. In particular simulating loading of the wheel with a flat loading element is advantageous since this is closer to the real operation conditions of a wheel running on a road surface.

In a further aspect of the invention, an average outer contour of the unloaded wheel can be calculated from the scanned contour data representing a perfect circular wheel. From this average outer contour, deviations of the scanned outer contour can be determined and the predetermined spring rate associated to the tyre tread can be corrected, for example. Furthermore, the non-uniformities such as radial or lateral runout or radial or lateral force variations of the loaded wheel can be determined on the basis of a first harmonic of the deviations from the calculated average values. It is also possible to determine said non-uniformities on the basis of peak to peak values resulting from the load simulation.

According to another aspect of the invention, a system for determining non-uniformities of a loaded wheel comprising a rim and a tyre mounted to the rim is provided. The system comprises a scanning device for scanning outer contour of the unloaded wheel, and a computer device connected to the scanning device. The computer device receives from the scanning device data representing the outer contour of the unloaded wheel and uses default values or measured or input values for the required parameters such as tyre inflation pressure, rim and tyre dimensions, rim and tyre type, and spring rate of the tyre tread and associated variations of the same, to simulate loading of the wheel and determine non-uniformities such as radial or lateral runout or radial or lateral force variations of the loaded wheel as set forth above.

The system can be an independent system or even a manageable mobile system that can be positioned close to a wheel mounted to a vehicle and lifted from the floor to freely rotate the wheel. The wheel can be rotated by hand or by means of a technical device so that the scanning device of the system is able to scan the whole circumference of the wheel. Alternatively, the wheel may be kept fixed and the scanning device may be made to rotate around the wheel. According to another aspect of the invention, the system may be part of a test lane that does not require the vehicle to be lifted; rather, the wheel is put into rotation by the test lane rollers and the whole circumference of the wheel is then scanned. With such configuration, rollers are used to transmit motion to the wheel, whereas wheel contour data acquisition is carried out in a non-contact manner by the scanning device. The corresponding rotary position of the wheel can be derived from the scanning data comprising identifiable features of the tyre or the rim so that an unambiguous assignment of the scanned surface contour to the associated rotary position is possible. Such a system is advantageous for quickly and convenient checking the uniformity characteristics of a wheel while mounted to a vehicle for diagnostic purposes, for example, and does not require demounting the wheel and mounting it to a rotatable support of a servicing apparatus such as a tyre changer or a wheel balancer.

According to another aspect of the invention, the scanning device comprises an optical scanner capable of contactless sensing the outer surface of the wheel and providing three dimensional outer contour data of at least a portion of the wheel, the portion comprising at least a tread of the tyre. The scanning can be performed by a laser system or another optical system emitting a light beam onto the surface of the wheel. The scattered or reflected light returning from the wheel surface is received in an optical receiver, wherein the distance of the light impinging point on the wheel surface to the light source of the light receiver is determined according to methods known in the art. Thus, a three dimensional image or model of the wheel surface can be generated and represented in the form of three dimensional contour data.

Another possible scanning technology known in the art provides three dimensional contour data of the wheel surface by emitting a light beam in the form of a flat sheet (sheet of light technology) impinging on the wheel surface in the form of a thin line. This line is observed from an oblique viewing angle by a camera, for example, and appears deformed according to the surface contour of the wheel. The exact spatial position and contour of the wheel surface can be derived from the location and deformation of the light line received in the receiver. Also other technologies for determine the outer contour of the unloaded wheel are feasible, such as mechanical scanning with contact sensors or other contact methods or contactless method like ultrasonic scanning and so on. The technology used for scanning the wheel surface is not critical for the invention as long as it provides outer contour data of the wheel having sufficient accuracy.

According to a further aspect, the invention provides a vehicle service apparatus which comprises a system for determining non-uniformities of a loaded wheel using simulation of the loading of the wheel with a virtual loading element and determined outer contour of the unloaded wheel together with a predetermined spring rate associated to the tyre tread, as set forth above. A scanning device of the apparatus used for other diagnostic purposes such as determining runout of the unloaded wheel, for example, can be used to provide the outer contour data of the unloaded wheel required for carrying out the invention. Also a computer device already incorporated in the vehicle service apparatus can be used to perform the load simulation according to the present invention by simply adding additional software features. Thus, a very convenient and cost effective method and apparatus for determining non-uniformities of a loaded wheel can be provided.

The vehicle service apparatus can be a wheel balancer, a tyre mounting/demounting apparatus or some other kind of wheel preparing/testing apparatus used for testing pre-mounted wheels in a vehicle assembling line of a vehicle manufacturer, for example.

According to a further aspect of the invention, the determined non-uniformities of the loaded wheel can be exploited and considered during the service operation carried out by the vehicle service apparatus. Thus, position and magnitude of balancing weights can be corrected according to the determined non-uniformities in a wheel balancer operation. It is also possible to shift the angular mounting position of a tyre on the rim in accordance to the determined non-uniformities of the loaded wheel so as to mitigate or eliminate force variations and runout in radial and/or lateral direction by compensating rim runout with the determined tyre non-uniformities, for example, and vice versa.

In a further development of the invention, it is possible to display to an operator at least one of the determined outer contour, the load simulation results, the determined non-uniformities and a tyre diagnostic result. Then the operator can decide how to proceed with the wheel. For example, the operator can decide to repeat the simulation with changed parameters or with a higher precision, if a simple simulation has been performed using default parameters and/or the contour of only one radial cross-section of the tyre. The system or apparatus carrying out the invention can also provide indications whether the tyre or the rim is defective and should be replaced, or whether the rim/tyre combination should be remounted with shifted angular position to each other, for example.

According to a further aspect of the invention, a system for determining non-uniformities of a loaded wheel by means of simulation of loading of the wheel with a virtual loading element using determined outer contour of the unloaded wheel and a predetermined spring rate associated to the tyre tread can be integrated in a fully automatic wheel servicing apparatus capable of mounting/demounting and/or balancing a tyre/rim assembly.

In the following, further advantages and embodiments of the inventive method and system are described in conjunction with the attached drawings. Thereby, the expressions left, right, below and above are referred to the drawings in an orientation of the drawings which allows the normal reading of the reference numbers.

DETAILED DESCRIPTION OF THE INVENTION

A first preferred embodiment of the invention will be described in the following with respect to FIG. 1.

Figure 1:
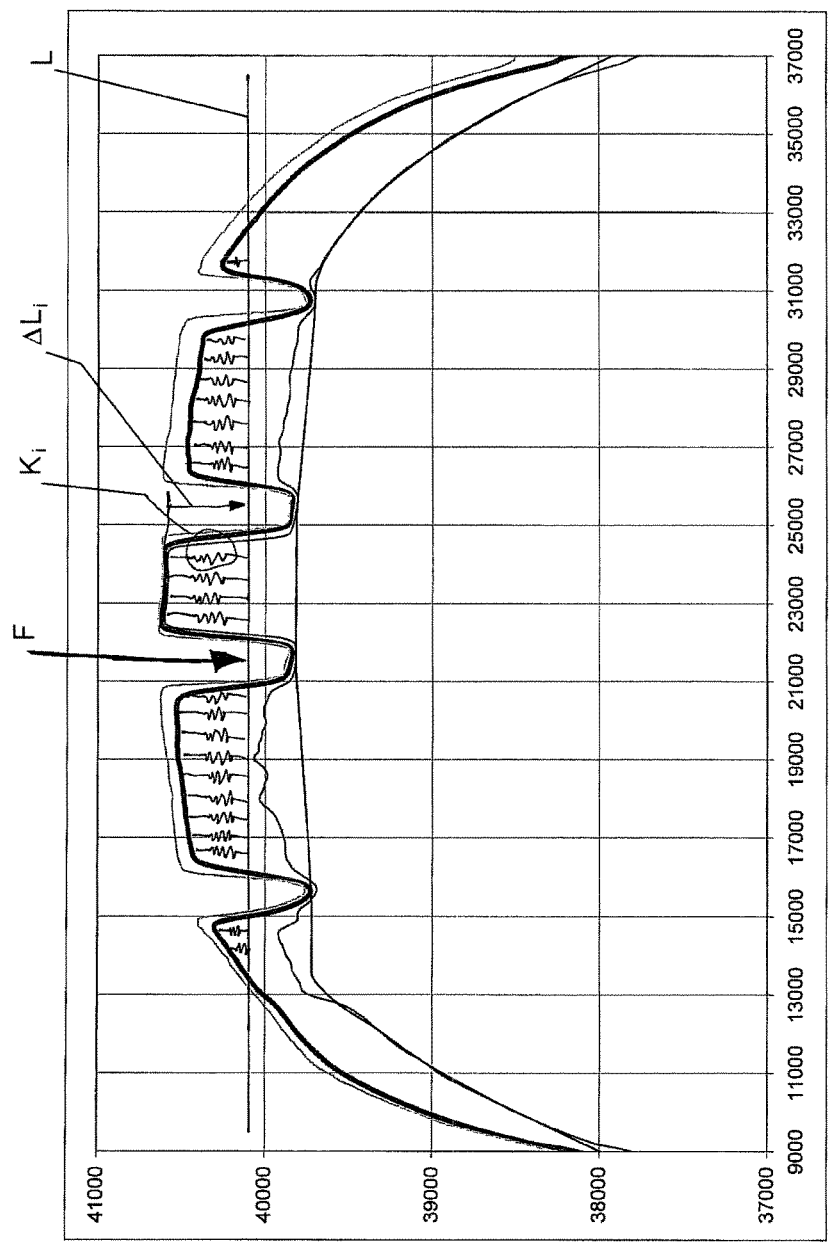
FIG. 1 is a diagram showing a portion of a determined outer contour of a radial cross-section of an unloaded wheel and a line L to which the outer contour will be deformed under simulative loading.

FIG. 1 shows a portion of an outer contour of a radial cross-section of an unloaded wheel. In FIG. 1, the x-axis represents an axial coordinate parallel to a wheel axis, while the y-axis represents a radial coordinate perpendicular to the wheel axis. The depicted portion comprises the tread surface and portions of the sidewalls of the tyre.

According to the method of the invention, it can be sufficient to scan and determine a portion of the wheel corresponding to that depicted in FIG. 1. However, it is also possible, and for some further developments of the invention described below it is favourable to determine at least the whole outer contour of the tyre and the junction of tyre and the rim, i.e. the rim edge. Furthermore, it is possible to scan and determine a substantial part of the outer contour of the rim, too.

For determining the outer contour of the unloaded wheel all around the circumference of the wheel, the wheel is rotated so that a scanning device scans the wheel surface by means of a laser beam, for example, in order to generate a three dimensional image (model) of the outer contour of the wheel. Laser devices capable of generating distance information and providing 3D contour data of a scanned wheel surface are known in the art. Other optical scanning devices using flat linear light beams generating lines of light on the wheel surface and evaluating images of the light lines deformed by the contour of the wheel surface are also known in the art, and are suitable for the purposes of the present invention. Such optical scanning devices as mentioned above are capable of providing outer contour of a scanned wheel with very high precision of several hundreds or thousands of detection points per radial cross-section. In circumferential direction of the wheel, preferably several hundred or more than thousand rotary positions of the wheel are scanned so that a sufficient number of radial cross-sections of the outer contour of the wheel can be determined.

After having determined the outer contour of the unloaded wheel, loading of the wheel (i.e. the rim/tyre assembly) with a virtual loading element is simulated. To this, the outer contour of a single radial cross-section as shown in FIG. 1, for example, is overlaid by a line L which is preferably parallel to the wheel axis. However, it is also possible to use a line L not parallel to the wheel axis to simulate asymmetric load which can result from a positive or negative camber of a wheel of a vehicle, for example. This line L represents the surface of a virtual loading element bearing against the tread of the tyre. In other words, it is assumed that the outer contour of the tyre tread is displaced and deformed such that the outer most portions of the tread, i.e. the lands between the tread grooves, coincide with the line L. The amount of displacement $\Delta L_i$ of the individual portions along the contour, represented by small symbolic springs in FIG. 1, can be determined by simple geometric subtraction of the spatial position data.

Using a predetermined spring rate K associated to the tyre tread, in particular an infinitesimal spring rate associated to the infinitesimal portions of the outer contour of the tread, an infinitesimal force $F_i$ can be calculated which is necessary to displace the infinitesimal tread portion until the outer contour coincides with the line L. To this, Hook's law $F=K \cdot \Delta L$ is used which describes the relationship between the displacement or deformation $\Delta L$ of a spring, the spring rate K and the force F applied to the spring.

It is preferred to maintain the detailed tread structure comprising lands and grooves unchanged, because the tread would not be deformed to such an extent that the tread profile would be completely planished. Rather, the calculation of the load simulation considers displacement of the whole tread section and only a coarse deformation reducing or eliminating curvature of the tread. Having calculated infinitesimal displacement forces $F_i$ for the individual tread contour portions under load, the total force F necessary to displace the tread contour to the line L can be calculated by summation or integration, respectively. This calculation may be represented by the equation $F=\Sigma(K \cdot \Delta L_i)$. Optionally, to increase accuracy, it is possible to also consider a tread deformation in the axial direction, so that the axial displacement under load of the tread portions close to the sidewalls is taken into account.

The predetermined spring rate K can be a default value chosen for standard conditions or can be calculated according to known tyre parameters such as width, shoulder height, inflation pressure, tyre type (such as puncture proof tyres, run-flat tyres and so on), for example. These parameters can be input by an operator or can be detected by the device automatically (for example by evaluating scanning data of the scanning device).

Thus, a total load force F of the virtual loading element displacing the tyre tread of the wheel to a certain extent represented by the line L can be determined for the respective rotary position of the considered radial cross-section of the determined outer contour of the unloaded wheel.

This total load force F applied by the virtual loading element is then determined for a plurality of rotary positions using the corresponding determined radial cross-section of the outer contour of the wheel.

If, according to one embodiment of the invention, the simulative displacement of the tyre tread, i.e. the position of the line L, for the respective rotary positions of the wheel is varied and set such that a constant total force F is achieved for all rotary positions of the wheel, then a variation of tread displacement and/or a varying distance of the virtual loading element to the rotation axis of the wheel varying along the circumferential direction, i.e. a radial runout of the loaded wheel, can be determined.

If, according to another embodiment of the invention, the position of the line L with respect to the rotation axis of the wheel, i.e. the distance between the virtual loading element and the wheel axis, is kept constant and the resulting total force F for all rotary positions of the wheel is determined as described above, then a radial force variation of the loaded wheel can be determined.

An average outer contour of the whole tread (and optional additional portions of the tyre and the rim) may be determined from the scanning data in order to provide a basis to which the position of the line L is kept constant, if the position of the axis of the wheel is not available. Thus, the position of the rotation axis of the wheel may be calculated from the average outer contour of the wheel.

Having simulated loading of the wheel according to one of the embodiments described above, the non-uniformities of the loaded wheel can be determined.

Having simulated loading with a constant force F for all rotary positions of the wheel as described above, the calculated positions of the line L (representing the surface of the virtual loading element) with respect to the wheel axis can be used to determine the radial runout of the loaded wheel. This can be done by calculating the first harmonic of the deviation of the distance of the calculated position of the line L to the calculated position of the rotation axis of the wheel, for example. The magnitude (amplitude) of the first harmonic of that distance deviation is a measure for the radial runout of the loaded wheel. It is also possible to determine a measure for the radial runout of the loaded wheel by calculating a peak to peak difference of said distance of the positions of the line L to the rotation axis of the wheel.

Having simulated loading with a constant distance between the position of the line L and the rotation axis of the wheel for all rotary positions of the wheel, the calculated total load forces F of the virtual loading element for the respective rotary positions of the wheel can be used to determine a radial force variation of the loaded wheel. This can be done by calculating the first harmonic of a deviation of the forces F associated to the respective rotary positions of the wheel from an average value of all determined forces, for example. The magnitude (amplitude) of that first harmonic of the force deviation is a measure for the radial force variation (RFV) of the loaded wheel. It is also possible to determine a measure for the radial force variation of the loaded wheel by calculating a peak to peak difference of said deviation of the total load forces F associated to the respective rotary positions of the wheel.

In a further development of the invention, optionally a lateral force variation or lateral runout of the loaded wheel can be determined analogue to the simulation procedure described above. This is possible since the deviations of the determined outer contour of the unloaded wheel from an ideal shape can result in lateral forces if, for example, a conical or otherwise asymmetric tread position of the tyre with respect to the center plane of the wheel is determined. Using a lateral (axial) spring rate $K_a$ associated to the tyre tread together with a predetermined relationship to a tread conicity, for example, enables determination of lateral forces and force variations and/or lateral runout of the loaded wheel on the basis of the determined outer contour of the unloaded wheel. Such a relationship may be determined empirically, or may be derived from a simulative deformation of the loaded wheel having such asymmetric tread portions. This is useful since lateral forces have significant influence on driving stability and in particular directional stability of a motor vehicle.

Furthermore, for more a sophisticated evaluation of the tyre behavior under load, asymmetric loading with a line L not parallel to the wheel axis and/or a loading in a direction not perpendicular to the wheel axis resulting in displacement of tread portions in an axial direction may be considered, too. The lateral spring rate $K_a$ may be predetermined or may be derived from the spring rate K and/or other tyre parameters such as the width, shoulder height, inflation pressure and tyre type, for example.

In the embodiment described above, the spring rate K associated to the tyre tread is assumed to be constant all over the tyre tread. This may provide simulation results with sufficient accuracy for lower demands.

Figure 2:
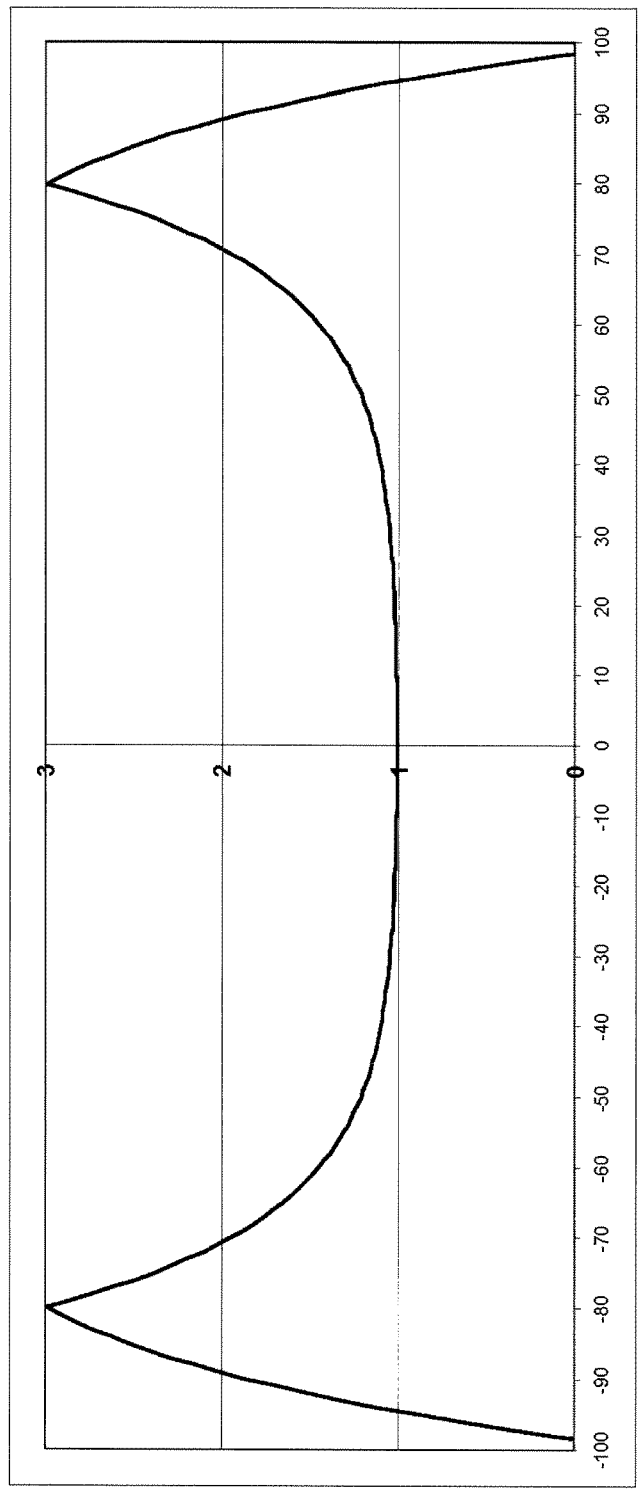
FIG. 2 is a diagram showing an example of weighting function used to vary the predetermined spring rate associated to the tyre tread in axial direction of the wheel.
Figure 3:
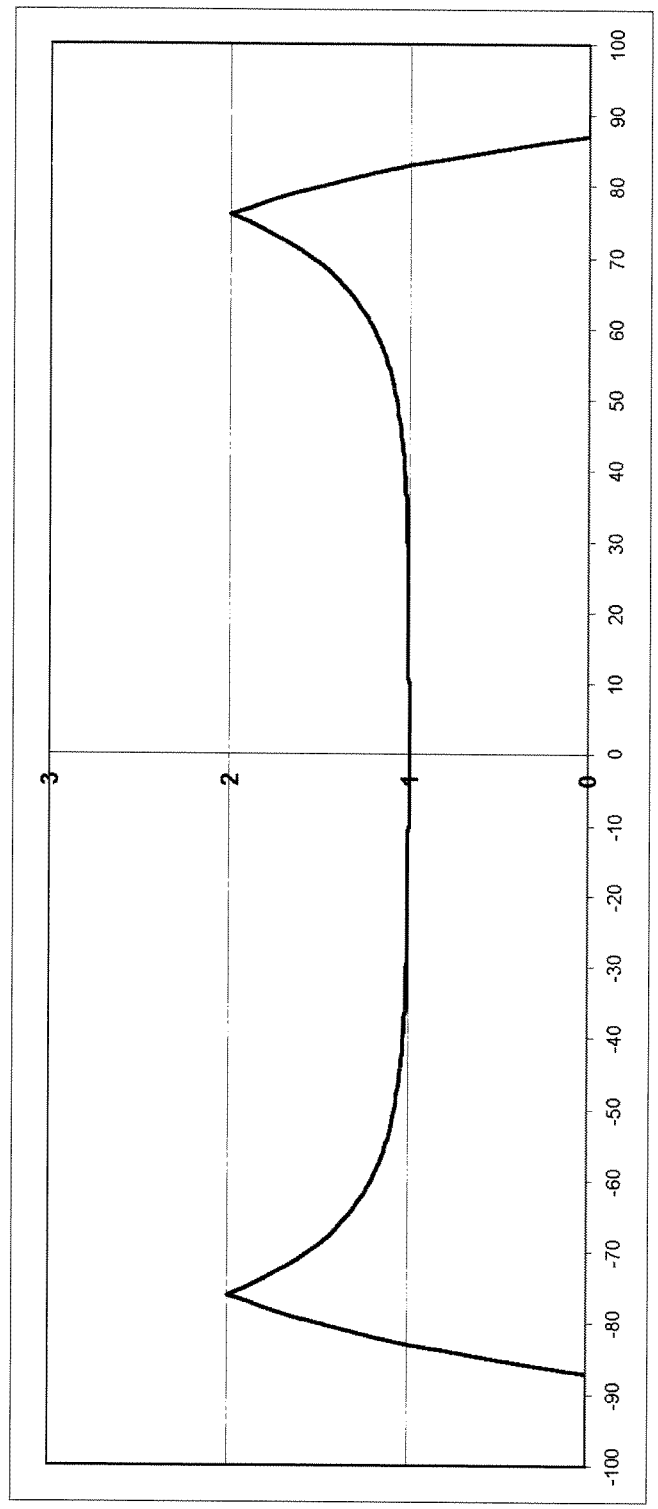
FIG. 3 is a diagram showing another example of weighting function used to vary the predetermined spring rate associated to the tyre tread in axial direction of the wheel.

In order to enhance the method and increase accuracy of the simulation results, according to another embodiment of the invention, the predetermined spring rate K associated to the tyre tread can be defined as an infinitesimal spring rate $K_i$ varying in accordance to an axial position of an associated tread portion. Then the calculation of the total force F required to displace a tread contour to the line L, as mentioned above, may be represented by the equation $F=\Sigma(K_i \cdot \Delta L_i)$. This variation of the spring rate can be accomplished by a corresponding weighting function. Examples for such weighting functions are shown in FIGS. 2 and 3, in which the x-axis represents a centered tyre width in millimeter (mm), while the y-axis represents a weighing factor normalized to 1 in the center of the wheel width.

With such weighting functions, the stronger influence of the edge portions in axial direction of the tread on the tyre stiffness and spring rate can be taken into account to increase accuracy of the load simulation. The edge portion in axial direction of the tread in general are stiffer, i.e. have a higher spring rate, because of the influence of the sidewalls of the tyre which are deformed when the edge portions of the tread are displaced. This can be compensated by a stronger (higher) spring rate at the edges of the tyre tread which normally engage with the loading element later, i.e. with larger tread displacements and higher total load forces, similar to the radial cross-sections of the outer contour adjacent to the considered radial cross-section of the respective rotary position of the wheel.

Furthermore and independent from the above embodiment, the predetermined spring rate K associated to the tyre tread can be an infinitesimal spring rate $K_i$ which varies in accordance to a radial position of an associated tread portion of the unloaded wheel. Also this variation of the spring rate can be accomplished by a corresponding weighting function (not shown). Besides a compensation effect for the contribution of the adjacent radial cross-sections of the outer contour of the wheel similar to the weighting functions described in the previous paragraph, a deviation of the tyre contour from a perfect circular circumference resulting from non-uniformities of the tyre structure can be taken into account to increase accuracy of the load simulation. Such non-uniformities in the tyre structure can result in tyre stiffness variations. Therefore, there is a relationship between the unloaded radial position of a tread portion and its associated spring rate which can be taken into account with a weighting function varying the spring rate in accordance to the radial position of the tread portion of the unloaded tyre.

Furthermore, in a further development of the invention, the predetermined spring rate can be a non-linear infinitesimal spring rate varying in accordance to a displacement of the tyre tread caused by the simulative loading. In this manner, it can be provided a compensation for the fact that displacement of a tread portion in the beginning (i.e. small displacement) is influenced mainly by local geometrical deformations of the tyre material, while with larger displacements of the tread, other factors such as the tyre inflation pressure and the tyre sidewall deformation gain influence with different strength. In this manner, accuracy of the load simulation can be increased. Also this spring rate variation can be accomplished by a corresponding weighting function and is able to compensate several aspects mentioned above, such as the contribution of adjacent radial cross-sections of the outer contour of the wheel bearing a part of the total load force F.

Of course, a combination the above mentioned weighting functions can be used in order to better comply with real conditions of wheel loading.

In a further embodiment of the invention, the step of determining the outer contour of the wheel can comprise determining a radial runout and/or a lateral runout of the rim. To this, preferably at least outer contour of the tyre and a portion of the rim, in particular the rim edge, are scanned and determined. The position of the tyre beads can be determined on the basis of the detected positions of the rim edges. Thus, radial or lateral runout of the rim can be considered in load simulation. Knowledge of radial or lateral runout of the rim enables to separate the effects of the rim and the effects of the tyre on the determined outer contour of the unloaded wheel and also on the determined non-uniformities of the loaded wheel. This results in an increase of accuracy of load simulation, and furthermore, an angular remount position of the rim/tyre assembly in order to mitigate or eliminate radial or lateral runout of the rim/tyre assembly can be determined, for example.

Figure 6:
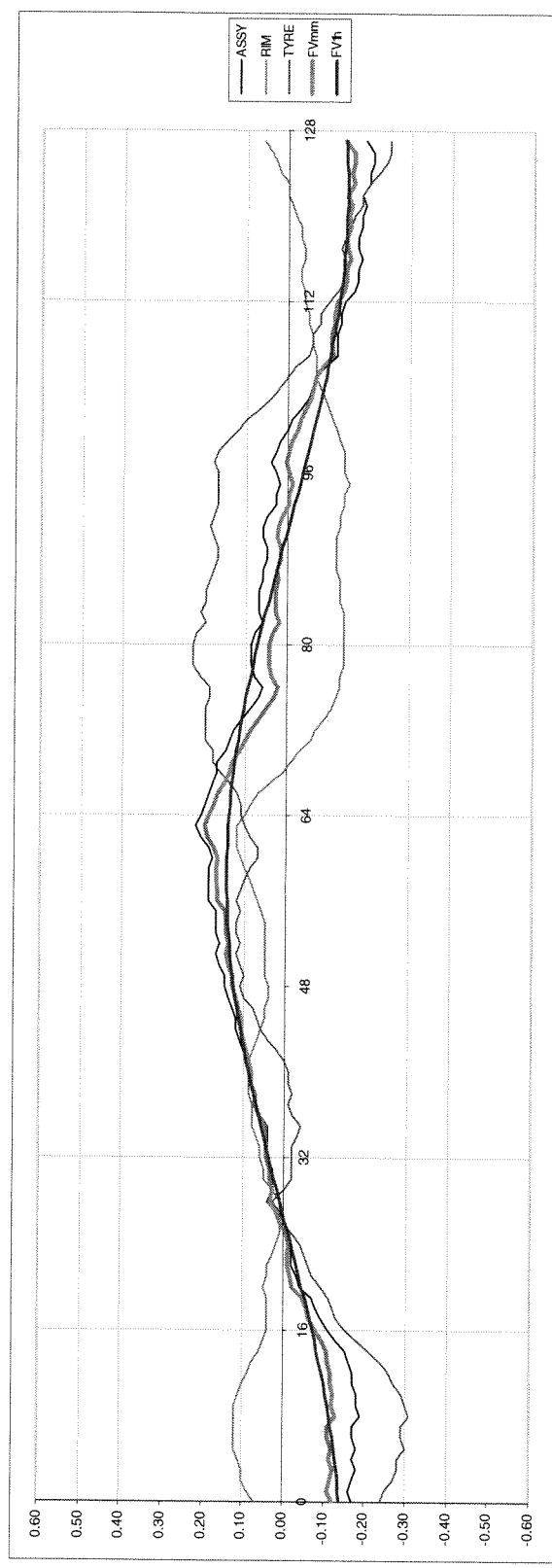
FIG. 6 is a diagram showing an example of separation between effects generated by the wheel rim and effects generated by the wheel tyre.

FIG. 6 shows an example of determined non-uniformities of a loaded wheel according to one of the above mentioned embodiments of the invention. In the diagram of FIG. 6, the line marked with ASSY represents the determined radial runout of the wheel, i.e. the rim/tyre assembly. The line marked with RIM represents the determined radial runout of the wheel rim. The line marked with TYRE represents the contribution of the tyre to the radial runout of the rim/tyre assembly calculated from the lines ASSY and RIM by subtraction, for example. The line marked with FVmm represents the radial force variation of the wheel (rim/tyre assembly) calculated from rim runout and tyre runout and considering the respective contributions of the rim and the tyre to the radial force variation. To this, additionally a rim spring rate can be taken into account, even if it is not necessary since the spring rate of the rim is in general much higher than that of the tyre so that loading the wheel with usual forces does not result in substantial rim deformation. The line marked with FV1h represents the calculated first harmonic of the radial force variation. This first harmonic can be used to determine a standard measure for the radial force variation. Another possibility is using peak to peak values as a measure for radial force variation, as already mentioned above.

Figure 4:
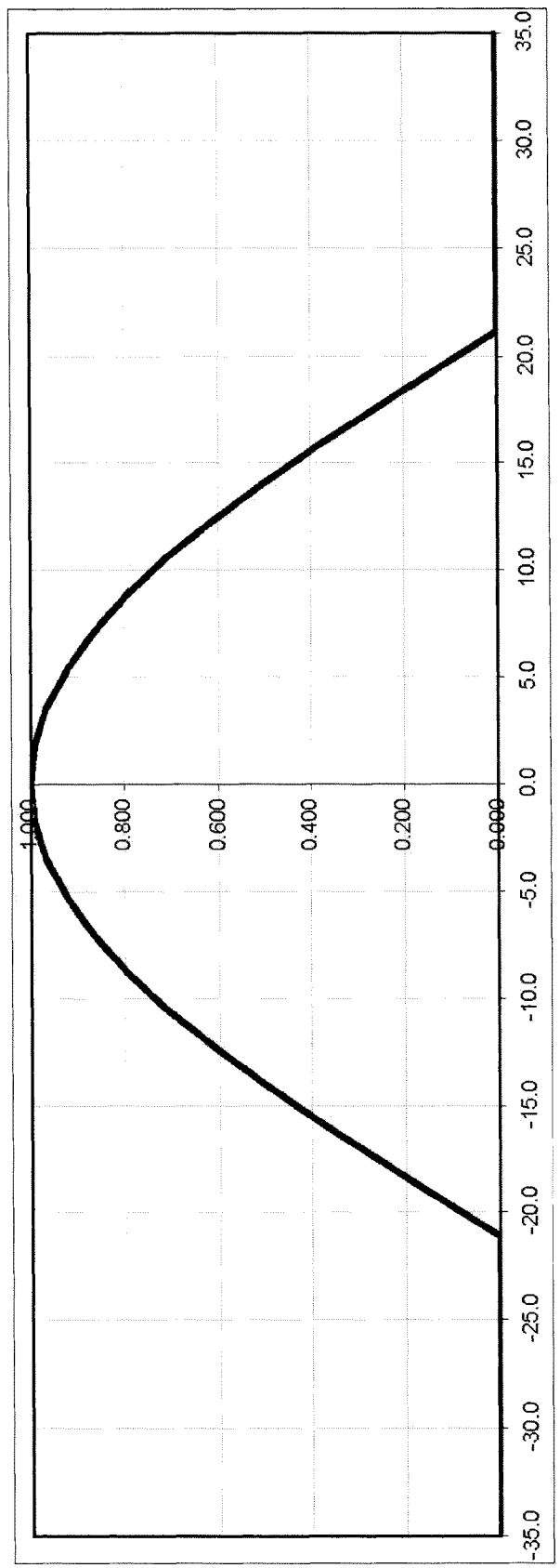
FIG. 4 is a diagram showing an example of a weighting function used to vary simulated tyre tread displacement along a circumference of a virtual load roller.
Figure 5:
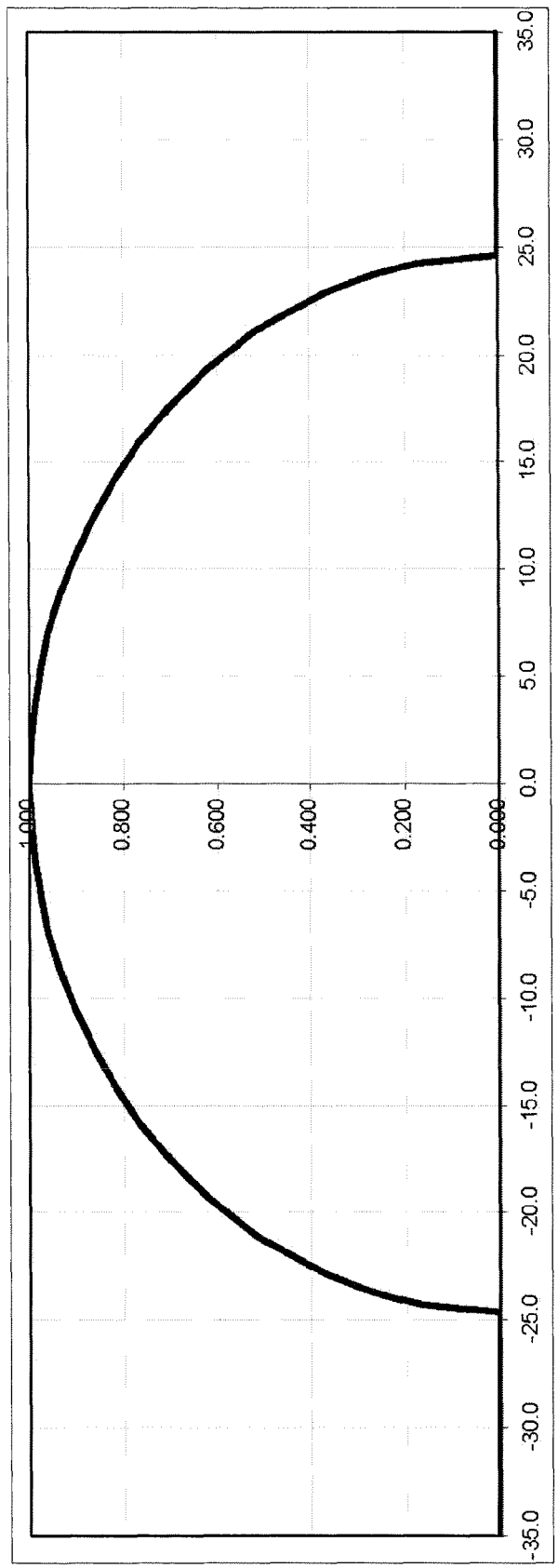
FIG. 5 is a diagram showing an example of another weighting function used to vary simulated tyre tread displacement along a circumference of another virtual load roller.

In a further developed embodiment of the invention, determined outer contour of a plurality of adjacent radial cross-sections of the wheel can be used to simulate loading of the wheel by considering a contact area between the virtual loading element and the tyre tread. In this manner, a more accurate load simulation can be achieved based on a more realistic tyre deformation due to load. Thus, loading of the wheel with virtual loading elements having different shape can be simulated. To this, determined outer contours of several adjacent radial cross-sections of the wheel are used and weighted with a weighting function as shown in FIGS. 4 and 5, for example. The diagrams in FIGS. 4 and 5 show weighting functions applied to the spring rate K associated to the respective tread portions of the tyre, wherein the x-axis represents an angle (in degrees) of the contact area in circumferential direction of a virtual load roller and the y-axis represents the weighting value normalized to 1 in the center of the contact area.

According to another embodiment of the invention, within the contact area between the tyre tread and the surface of the virtual loading element different displacement and/or different contact pressure of different tread portions can be considered in load simulation. For example, load rollers with different diameters can be used for the virtual loading element. It is also possible to use a flat plane for the virtual loading element. Such a plane can represent a road surface. This enables to simulate loading of the wheel close to real operation conditions of a wheel running on a road surface. To further enhance simulation and increase accuracy of the results, also in this method using a simulation of a contact area one or more of appropriate weighting functions described above in connection with FIGS. 2 to 5 can be used additionally.

According to another embodiment of the invention, a system for determining non-uniformities of a loaded wheel comprising a rim and a tyre mounted to the rim is provided. The system comprises a scanning device for scanning outer contour of the unloaded wheel, and a computer device connectable to the scanning device. Thus, the scanning device and the computer device can be separate devices. It is also possible to upgrade an existing vehicle wheel servicing apparatus, such as a wheel aligner or a tyre changer, for example, by adding said scanning device to apparatus and enhancing the computer device already present in the apparatus by adding additional software features enabling the apparatus to perform a method according to the present invention.

The computer device controls the scanning device and receives from the scanning device data representing the outer contour of the unloaded wheel. The computer device uses default values or can use measured or input values for the required parameters to perform the load simulation and determination of non-uniformities of the loaded wheel. Such parameters can be a tyre inflation pressure, rim and tyre dimensions, rim and tyre type, and average spring rate K of the tyre tread, for example. The computer device is able to correct the spring rate associated to the tyre tread according to the above mentioned parameters by varying the default values of by varying the weighting functions applied to the spring rate. Thus, a very precise simulation and very accurate values of the determined non-uniformities can be achieved.

According to another embodiment of the invention, the system and the method of the invention described above can be integrated into a vehicle service apparatus. Thus, a very convenient and cost effective method and apparatus for determining non-uniformities of a loaded wheel can be provided, while the results of the determination can be used during a service operation performed by the servicing apparatus.

The invention claimed is:

1. A method for determining non-uniformities of a loaded wheel comprising a rim and a tyre mounted to the rim, the method comprising the steps of:

determining, in a scanning device configured to scan an outer contour of the wheel, an outer contour of at least a portion of the unloaded wheel, the portion comprising at least a tread of the tyre, simulating, in a computer device communicatively connectable to the scanning device, loading of the wheel with a virtual loading element bearing against the tyre tread for a plurality of rotary positions of the wheel on the basis of the determined outer contour of the unloaded wheel, a displacement of the determined outer contour caused by the virtual loading element, and a predetermined spring rate associated to the tyre tread, and determining, in the computer device, non-uniformities of the loaded wheel using the simulation results.

2. The method according to claim 1,
wherein the step of simulating comprises simulative loading the wheel with a predetermined force exerted by the virtual loading element, and
wherein the step of determining non-uniformities comprises determining radial runout of the loaded wheel.

3. The method according to claim 1,
wherein the step of simulating comprises simulative loading the wheel with a predetermined distance between the virtual loading element and a rotation axis of the wheel, and
wherein the step of determining non-uniformities comprises determining radial force variation of the loaded wheel.

4. The method according to claim 1,
wherein the step of determining non-uniformities further comprises determining at least one of lateral force variation or lateral runout of the loaded wheel.

5. The method according to claim 1,
wherein the predetermined spring rate is an infinitesimal spring rate varying in accordance to at least one of an axial position and a radial position of an associated tread portion.

6. The method according to claim 1,
wherein the predetermined spring rate is a non-linear infinitesimal spring rate varying in accordance to a displacement of the tyre tread caused by the loading.

7. The method according to claim 1,
wherein the predetermined spring rate is corrected according to at least one of a tyre type, a tyre size, a tyre inflation pressure and a rim type.

8. The method according to claim 1,
wherein the step of determining the outer contour of the wheel comprises determining at least one of a radial runout and a lateral runout of the rim, and
wherein the step of simulating comprises consideration of the determined runout of the rim.

9. The method according to claim 1,
wherein the step of simulating uses the determined outer contour of a single radial cross-section of the wheel.

10. The method according to claim 1,
wherein the step of simulating uses the determined outer contour of a plurality of adjacent radial cross-sections of the wheel to simulate a contact area between the virtual loading element and the tyre tread.

11. A system for determining non-uniformities of a loaded wheel comprising a rim and a tyre mounted to the rim, the system comprising:
a scanning device for scanning outer contour of the unloaded wheel, and
a computer device connectable to the scanning device and adapted to carry out the method according to claim 1.

12. The system according to claim 11,
wherein the scanning device comprises an optical scanner capable of contactless sensing the outer surface of the wheel and providing three dimensional outer contour data of at least a portion of the wheel, the portion comprising at least a tread of the tyre.

13. A vehicle service apparatus, the apparatus comprising a system according to claim 11.

14. The vehicle service apparatus according to claim 13, wherein the apparatus is a wheel balancer, a tyre mounting/demounting apparatus or a wheel test stand.

15. The vehicle service apparatus according to claim 13, wherein the determined non-uniformities of the loaded wheel are considered during the service operation carried out by the vehicle service apparatus.

* * * * *